United States Patent
Hwang et al.

(10) Patent No.: US 12,229,660 B2
(45) Date of Patent: Feb. 18, 2025

(54) CROSSBAR ARRAY APPARATUSES BASED ON COMPRESSED-TRUNCATED SINGULAR VALUE DECOMPOSITION (C-TSVD) AND ANALOG MULTIPLY-ACCUMULATE (MAC) OPERATION METHODS USING THE SAME

(71) Applicant: Samsung Electronics Co., Ltd., Suwon-si (KR)

(72) Inventors: Youngnam Hwang, Hwaseong-si (KR); Jaewon Yang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 952 days.

(21) Appl. No.: 17/319,679

(22) Filed: May 13, 2021

(65) Prior Publication Data

US 2022/0108159 A1 Apr. 7, 2022

(30) Foreign Application Priority Data

Oct. 7, 2020 (KR) .................. 10-2020-0129509

(51) Int. Cl.
*G06N 3/065* (2023.01)
*G06F 7/544* (2006.01)
(Continued)

(52) U.S. Cl.
CPC ........... *G06N 3/065* (2023.01); *G06F 7/5443* (2013.01); *G06F 17/16* (2013.01); *G06N 3/049* (2013.01)

(58) Field of Classification Search
CPC ........ G06N 3/065; G06N 3/049; G06N 3/048; G06N 3/08; G06N 3/063; G06N 3/04; G06F 7/5443; G06F 17/16; G11C 13/0004
See application file for complete search history.

(56) References Cited

U.S. PATENT DOCUMENTS 9,262,724 B2 2/2016 Kingsbury et al.
9,728,184 B2 8/2017 Xue et al.
(Continued)

FOREIGN PATENT DOCUMENTS

KR 20190059033 A 5/2019
KR 20200000686 A 1/2020

OTHER PUBLICATIONS

"Chong Li, et al., "Constrained Optimization Based Low-Rank Approximation of Deep Neural Networks," European Conference on Computer Vision 2018, pp. 746-761".
(Continued)

*Primary Examiner* — Xiao En Mo
(74) *Attorney, Agent, or Firm* — FINNEGAN, HENDERSON, FARABOW, GARRETT & DUNNER, L.L.P.

(57) ABSTRACT

A compressed-truncated singular value decomposition (C-TSVD) based crossbar array apparatus is provided. The C-TSVD based crossbar array apparatus may include an original crossbar array in an m×n matrix having row input lines and column output lines and including cells of a resistance memory device, or two partial crossbar arrays obtained by decomposing the original crossbar array based on C-TSVD, an analog to digital converter (ADC) that converts output values of column output lines of sub-arrays obtained through array partitioning, an adder that sums up results of the ADC to correspond to the column output lines, and a controller that controls application of the original crossbar array or the two partial crossbar arrays. Input values are input to the row input lines, a weight is multiplied by the input values and accumulated results are output as output values of the column output lines.

17 Claims, 20 Drawing Sheets

(51) Int. Cl.
*G06F 17/16* (2006.01)
*G06N 3/049* (2023.01)

(56) References Cited

U.S. PATENT DOCUMENTS

| | | | |
|---|---|---|---|
| 10,268,232 | B2 | 4/2019 | Harris et al. |
| 10,554,272 | B2 | 2/2020 | Tong et al. |
| 2004/0190636 | A1 | 9/2004 | Oprea |
| 2019/0122108 | A1 | 4/2019 | Kliegl et al. |
| 2019/0294199 | A1 | 9/2019 | Carolan et al. |
| 2019/0332941 | A1 | 10/2019 | Towal et al. |
| 2019/0392316 | A1 | 12/2019 | Kim et al. |
| 2020/0401373 | A1* | 12/2020 | Lesso ................... G06N 3/065 |
| 2021/0390382 | A1* | 12/2021 | Kwon .................. G06F 7/4876 |

OTHER PUBLICATIONS

"Page et al., "FPGA-Based Reduction Techniques for Efficient Deep Neural Network Deployment," 2016 IEEE 24th Annual International Symposium on Field-Programmable Custom Computing Machines, May 1-3, 2016".

* cited by examiner

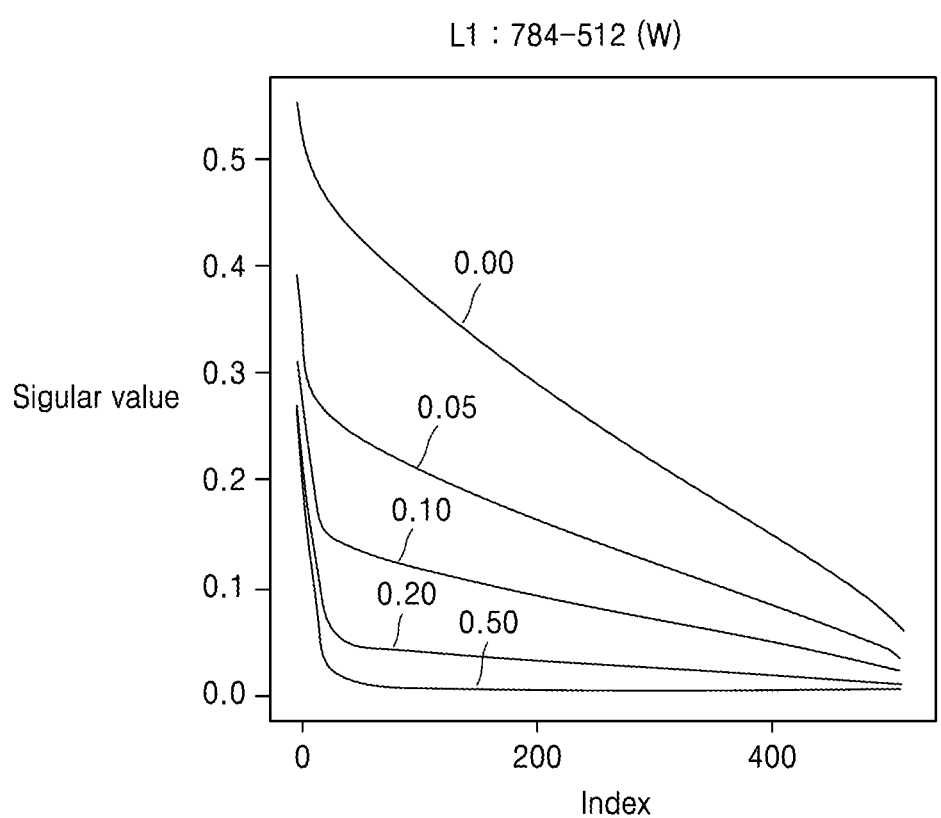

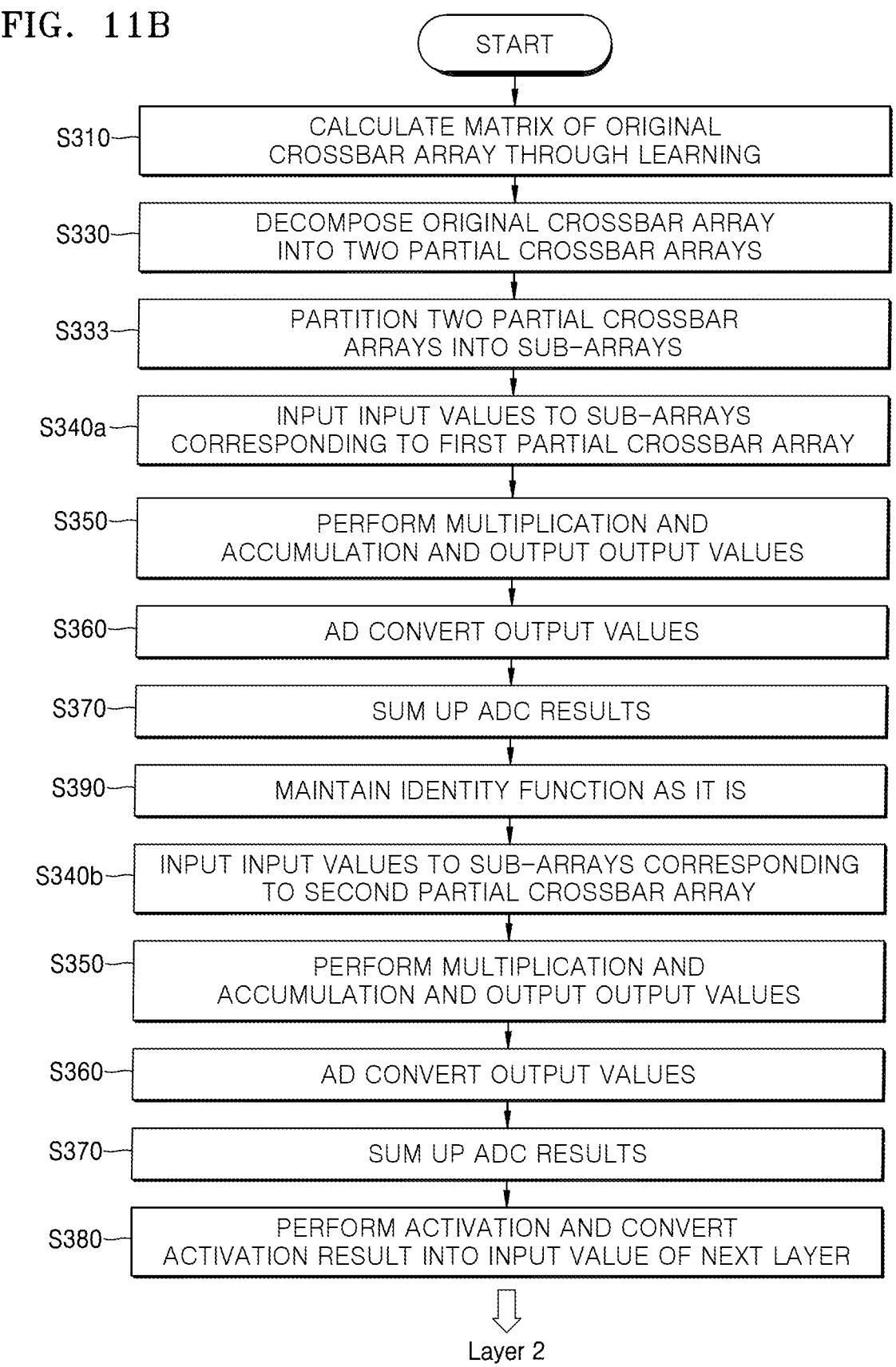

CROSSBAR ARRAY APPARATUSES BASED ON COMPRESSED-TRUNCATED SINGULAR VALUE DECOMPOSITION (C-TSVD) AND ANALOG MULTIPLY-ACCUMULATE (MAC) OPERATION METHODS USING THE SAME

CROSS-REFERENCE TO RELATED APPLICATION

This application is based on and claims priority under 35 U.S.C. § 119 to Korean Patent Application No. 10-2020-0129509, filed on Oct. 7, 2020, in the Korean Intellectual Property Office, the disclosure of which is incorporated by reference herein in its entirety.

TECHNICAL FIELD

The present disclosure relates to hardware apparatuses related to neuromorphic computing, and to analog multiply-accumulate (MAC) operation methods using the same.

BACKGROUND

In order to overcome structural limits of chips based on the conventional Von Neumann structure, integrated circuit (IC) chip developers have been developing neural network hardware and/or neuromorphic computing hardware. Such hardware may be based on neural networks that include neurons, which are the basic units of the human brain, and synapses connecting the neurons. Neural networks may exceed limits of conventional machine learning algorithms, and in particular show potential in image recognition, pattern learning, and cognitive ability, and may be able to approach abilities close to those of human beings. Neural network hardware and/or neuromorphic computing hardware is used in various fields. In addition, dedicated application specific integrated chips (ASIC) for rapidly performing an operation work of neural networks using low power are being considered and developed.

SUMMARY

The inventive concepts relate to an array apparatuses based on compressed-truncated singular value decomposition (C-TSVD) capable of reducing the number of sub-arrays in array partitioning while minimizing deterioration of inference accuracy and latency and analog multiply-accumulate (MAC) operation methods using the same.

According to some aspects of the inventive concepts, there is provided a compressed-truncated singular value decomposition (C-TSVD) based crossbar array apparatus, that includes an original crossbar array in an m×n matrix having n row input lines and m column output lines and including cells of a resistance memory device, or two partial crossbar arrays obtained by partitioning the original crossbar array based on C-TSVD, where n and m are natural numbers. The apparatus also comprises an analog to digital converter (ADC) configured to convert output values of column output lines of sub-arrays obtained by partitioning the original crossbar array or the two partial crossbar arrays through array partitioning, an adder configured to sum up results of the ADC to correspond to the column output lines, and a controller configured to control application of the original crossbar array or the two partial crossbar arrays. The C-TSVD based crossbar array apparatus may correspond to one layer of a neural network in neuromorphic computing. Input values may be input to the row input lines, a weight may be multiplied by the input values, and accumulated results may be output as output values of the column output lines, and the weight corresponds the original crossbar array or the two partial crossbar arrays.

According to some aspects of the inventive concepts, there is provided a C-TSVD based crossbar array apparatus, including two partial crossbar arrays obtained by partitioning an original crossbar array in an m×n matrix having n row input lines and m column output lines and including cells of a resistance memory device based on C-TSVD, where n and m are natural numbers. The apparatus also includes an analog to digital converter (ADC) configured to convert output values of column output lines of sub-arrays obtained by partitioning the two partial crossbar arrays through array partitioning, and an adder configured to sum up results of the ADC to correspond to the column output lines. The C-TSVD based crossbar array apparatus may correspond to one layer of a neural network in neuromorphic computing. Input values may be input to the row input lines, a weight may be multiplied by the input values and accumulated results are output as output values of the column output lines, and the weight may correspond the two partial crossbar arrays.

According to some aspects of the inventive concepts, there is provided an analog multiply-accumulate (MAC) operation methods, including calculating an original crossbar array in an m×n matrix connected by n row input lines and m column output lines (where n and m are natural numbers) and including cells of a resistance memory device, selectively performing compressed-truncated singular value decomposition (C-TSVD) partitioning the original crossbar array into two partial crossbar arrays, partitioning the original crossbar array, or the two partial crossbar arrays, into sub-arrays in accordance with a result of selectively performing the C-TSVD inputting input values to row input lines of the sub-arrays, multiplying a weight by the input values and accumulating the multiplication results in the sub-arrays and outputting output values to the column output lines of the sub-arrays, analog to digital (AD) converting the output values of the column output lines by using an analog to digital converter (ADC), and summing up the ADC results to correspond to the column output lines by using an adder. A crossbar array apparatus corresponding to one layer of a neural network may be used in neuromorphic computing. The crossbar array apparatus may include the original crossbar array or the two partial crossbar arrays, the ADC, the adder, and the controller. In the selectively performing of the C-TSVD, application of the original crossbar array or the two partial crossbar arrays may be controlled by the controller.

BRIEF DESCRIPTION OF THE DRAWINGS

Embodiments of the inventive concepts will be more clearly understood from the following detailed description taken in conjunction with the accompanying drawings in which.

Figure 5B:
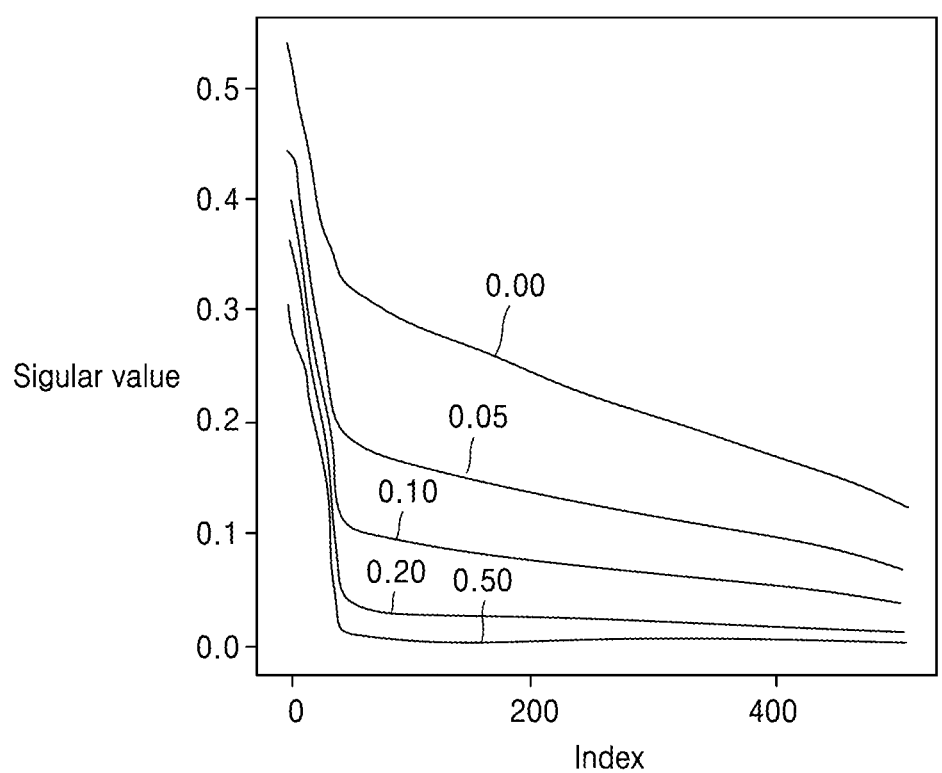
Figure 6:
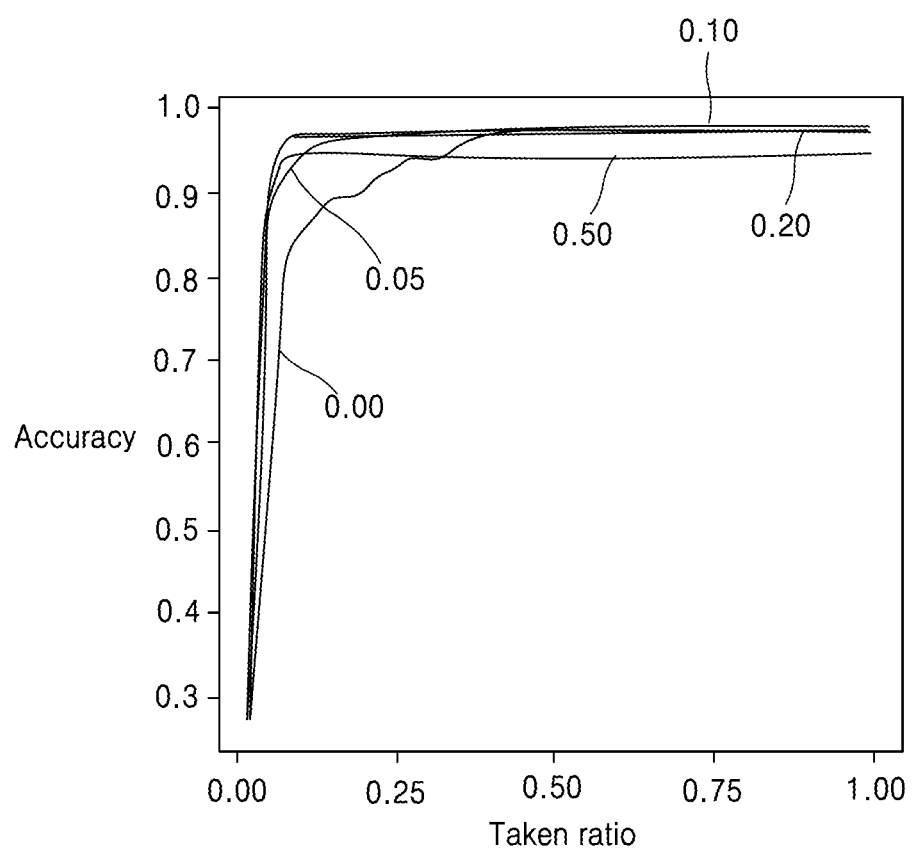
Figure 7A:
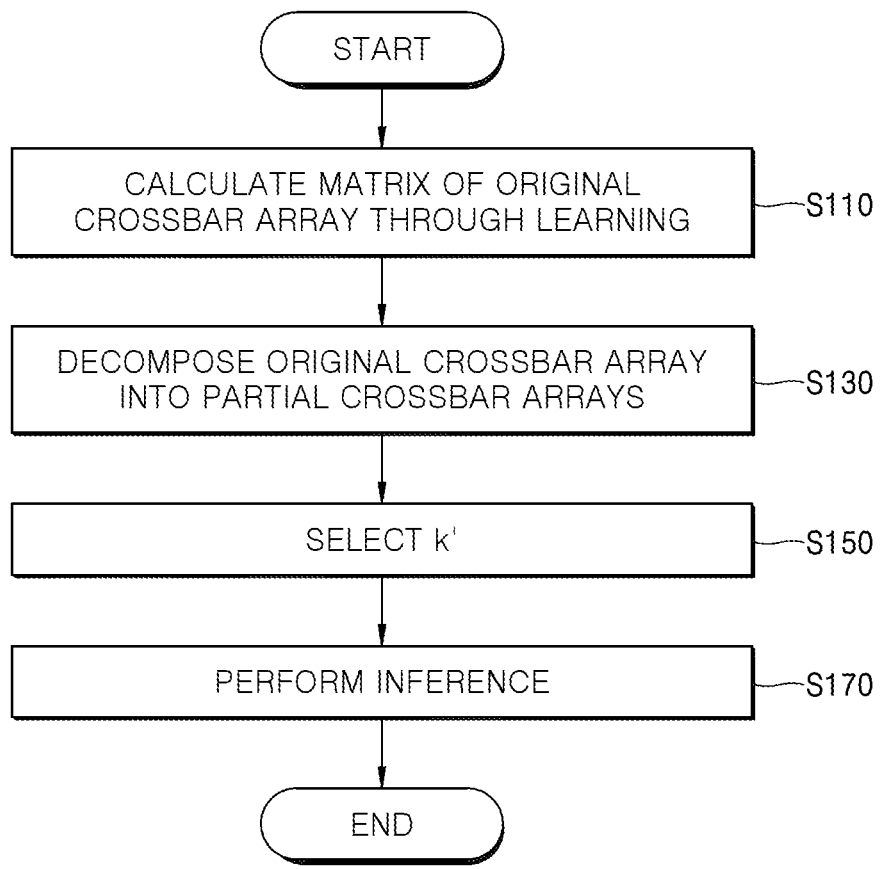
Figure 7B:
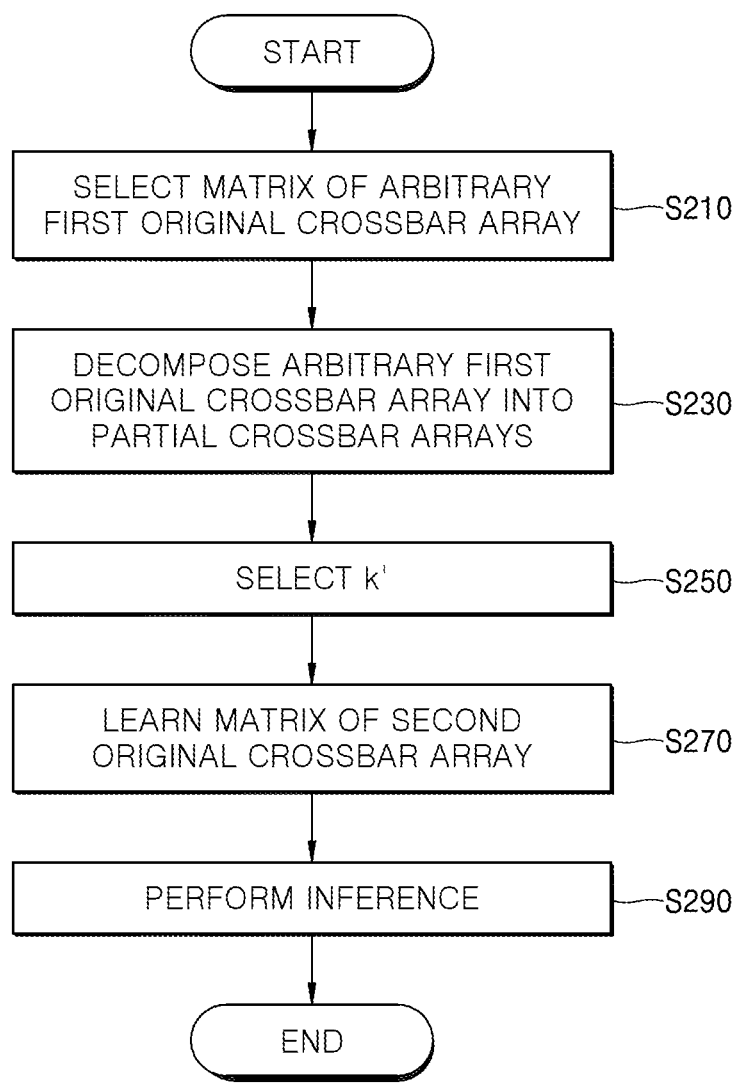
Figure 8A:
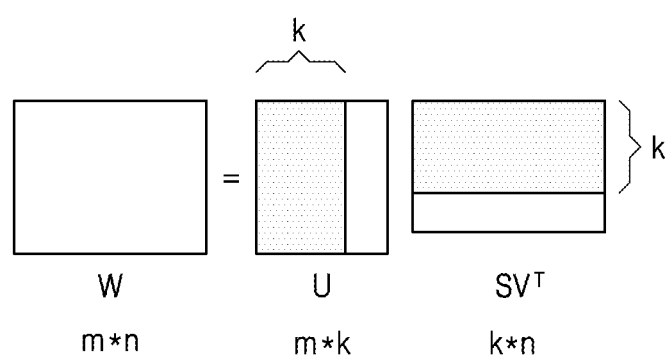
Figure 8B:
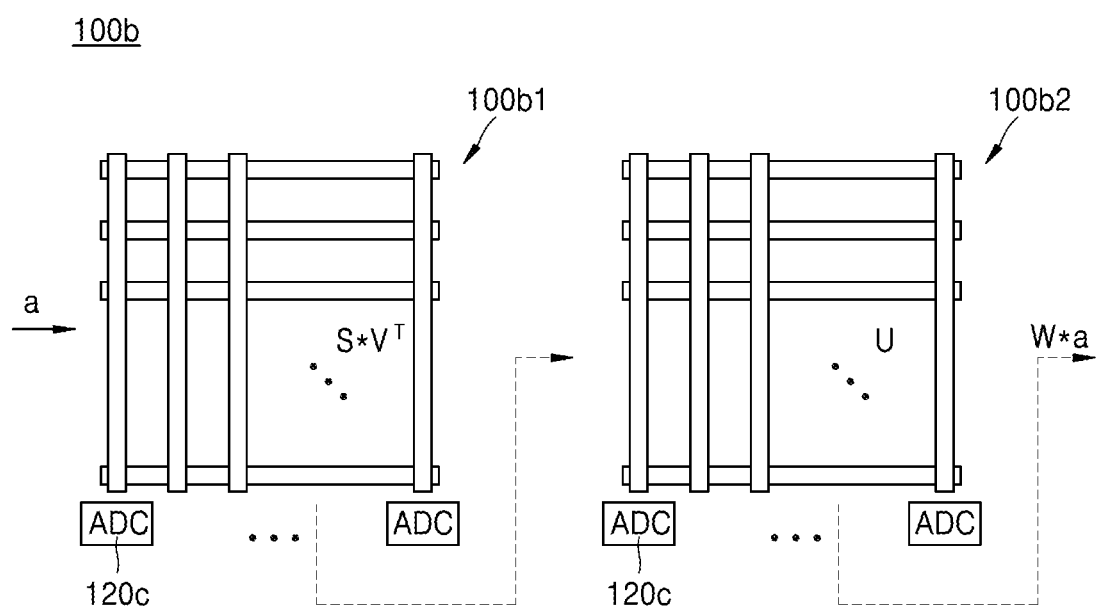
Figure 9A:
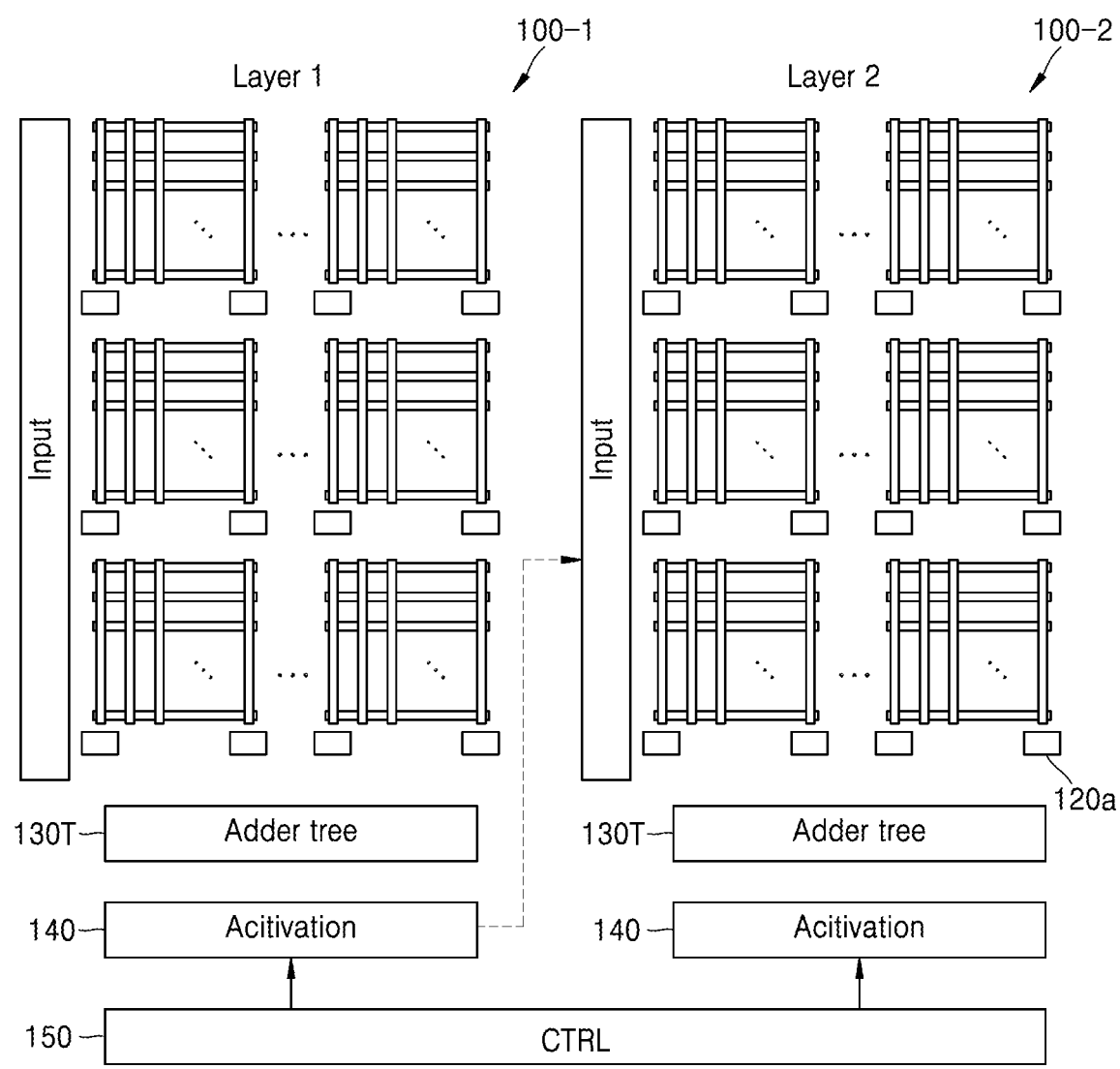
Figure 9B:
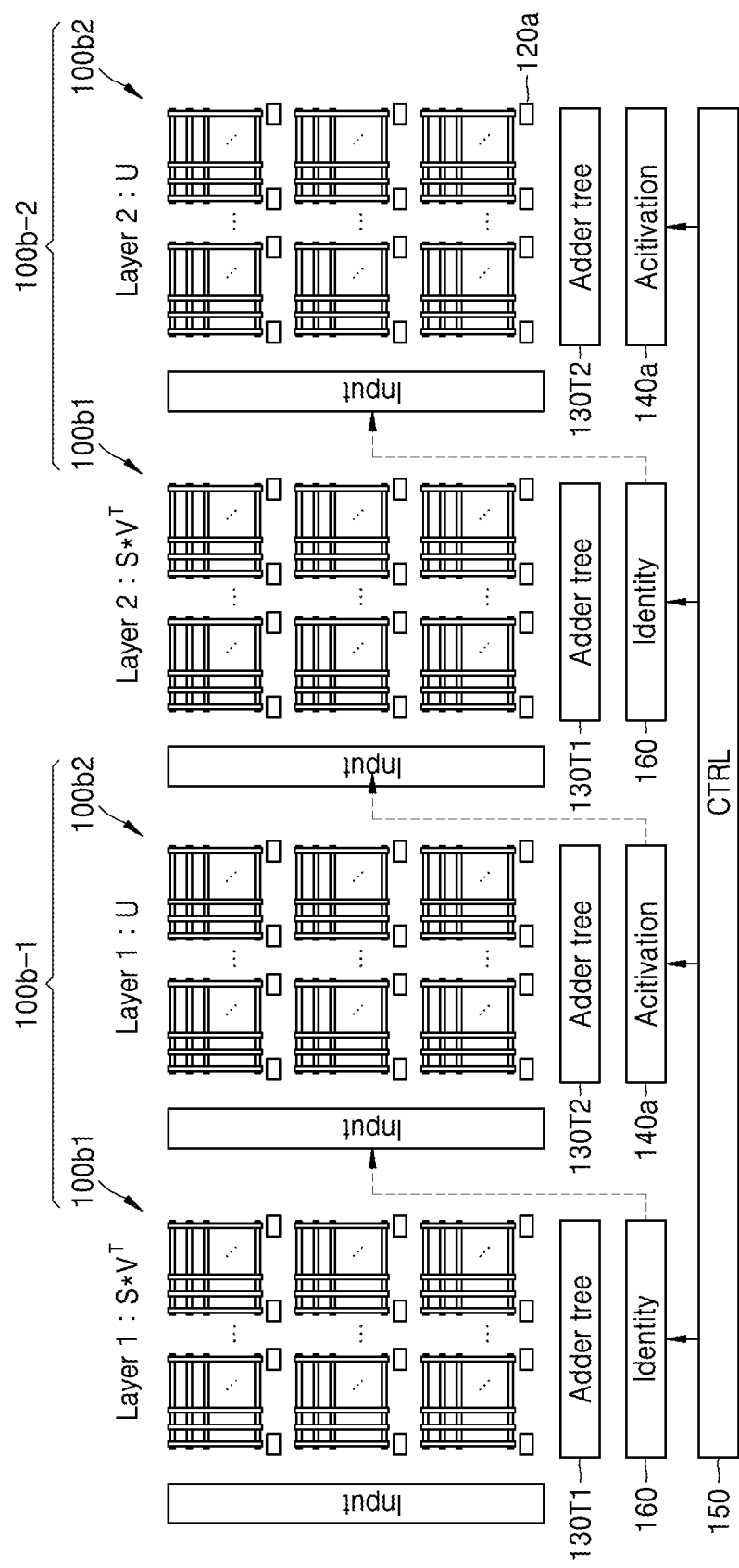
Figure 10:
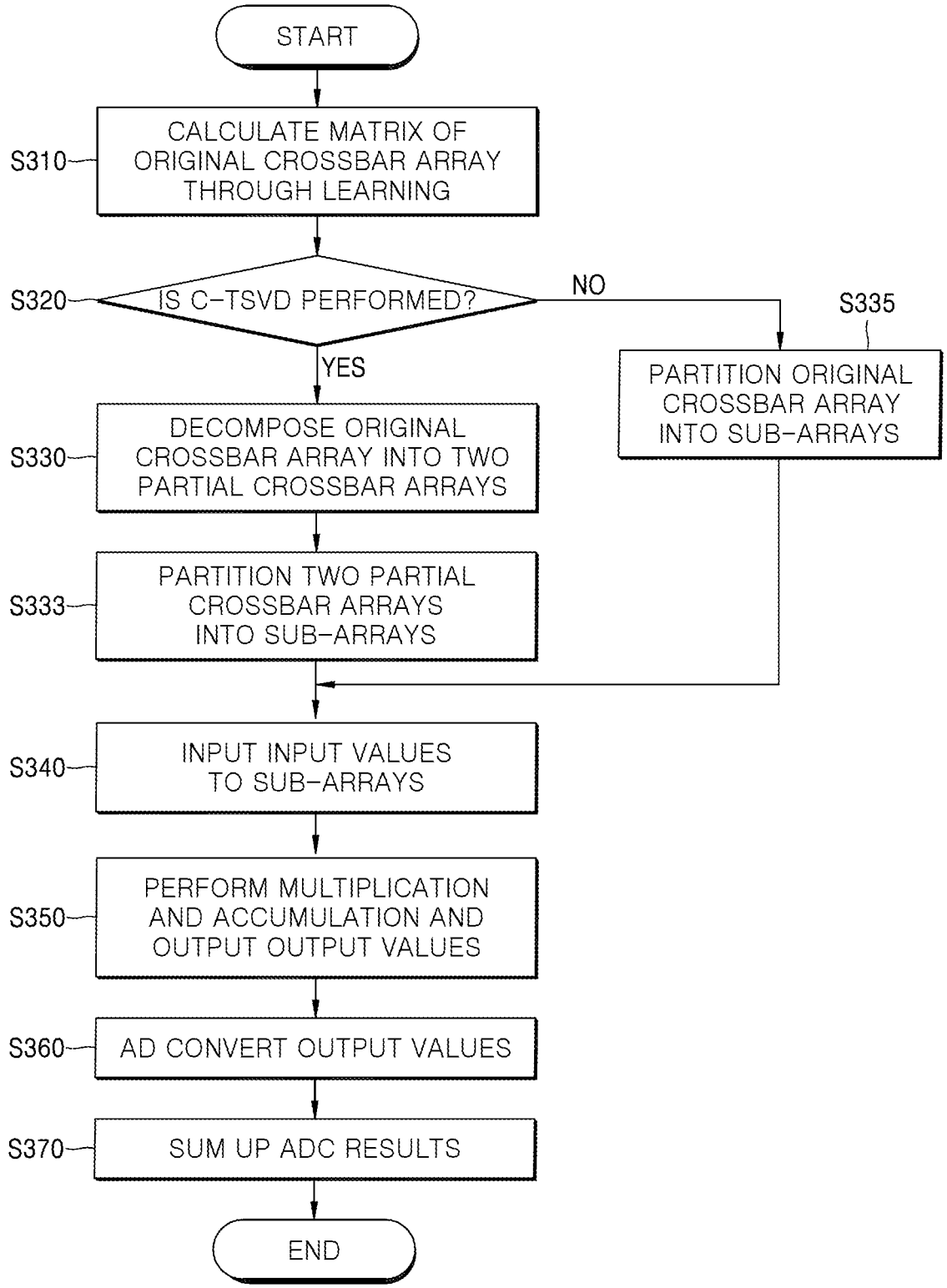
Figure 11A:
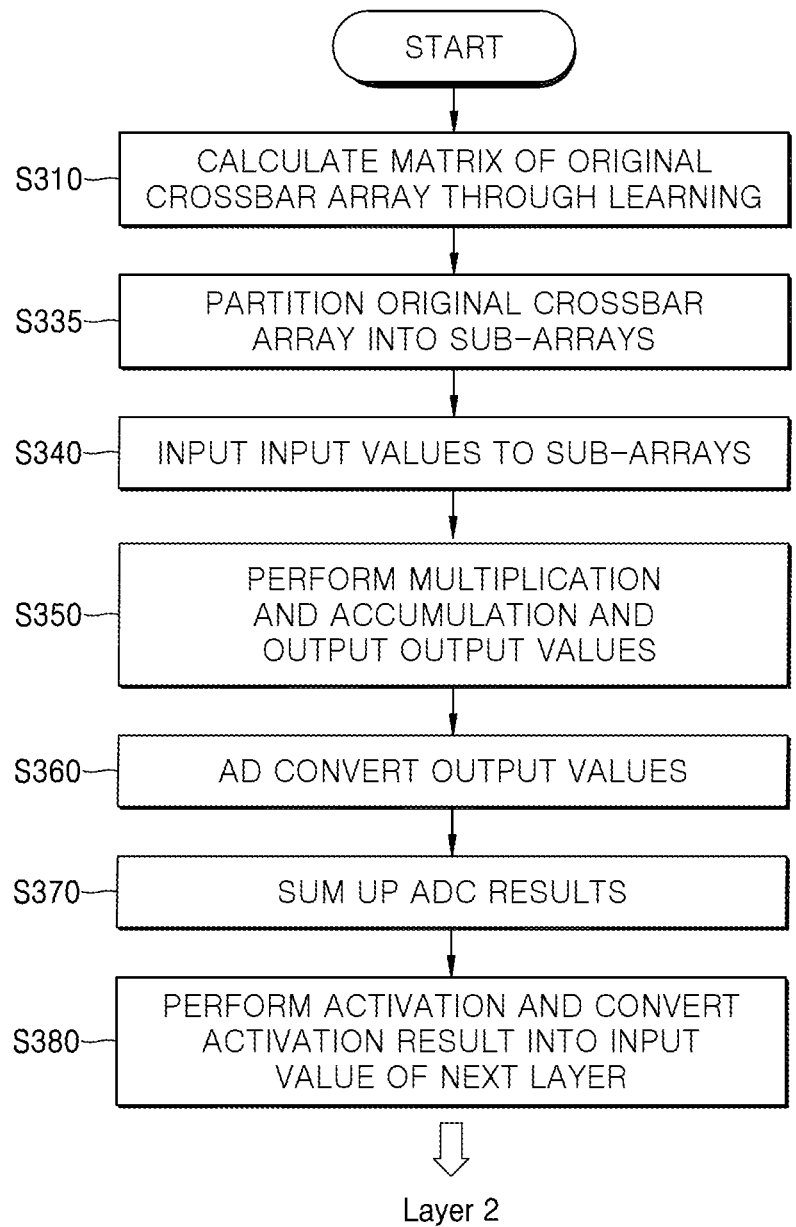

adopted in a crossbar array apparatus according to some embodiments of the inventive concepts;

FIGS. 5A and 5B are graphs arranging diagonal matrix components of a matrix S in order to size by applying TSVD;

FIG. 6 is a graph illustrating inference accuracy in accordance with a taken ratio among diagonal matrix components of a matrix S;

FIGS. 7A and 7B are flowcharts schematically illustrating two learning methods in relation to influence of a regularization parameter on inference accuracy in accordance with a taken ratio;

FIGS. 8A and 8B are conceptual diagrams illustrating the concept of partitioning an original crossbar array into partial crossbar arrays based on compressed-truncated singular value decomposition (C-TSVD) adopted in a crossbar array apparatus according to some embodiments of the inventive concepts;

FIGS. 9A and 9B are conceptual diagrams illustrating that a crossbar array apparatus according to some embodiments may be applied to layers of a neural network in neuromorphic computing;

FIG. 10 is a flowchart illustrating an analog multiply-accumulate (MAC) operation method using a crossbar array apparatus according to some embodiments of the inventive concepts; and FIGS. 11A and 11B are flowcharts illustrating the analog MAC operation method of FIG. 10 in relation to a layer of a neural network in neuromorphic computing.

DETAILED DESCRIPTION OF THE EMBODIMENTS

Hereinafter, some embodiments of the inventive concepts will be described in detail with reference to the accompanying drawings. Like reference numerals refer to like elements throughout and previously given description of the elements will be omitted.

Figure 1A:
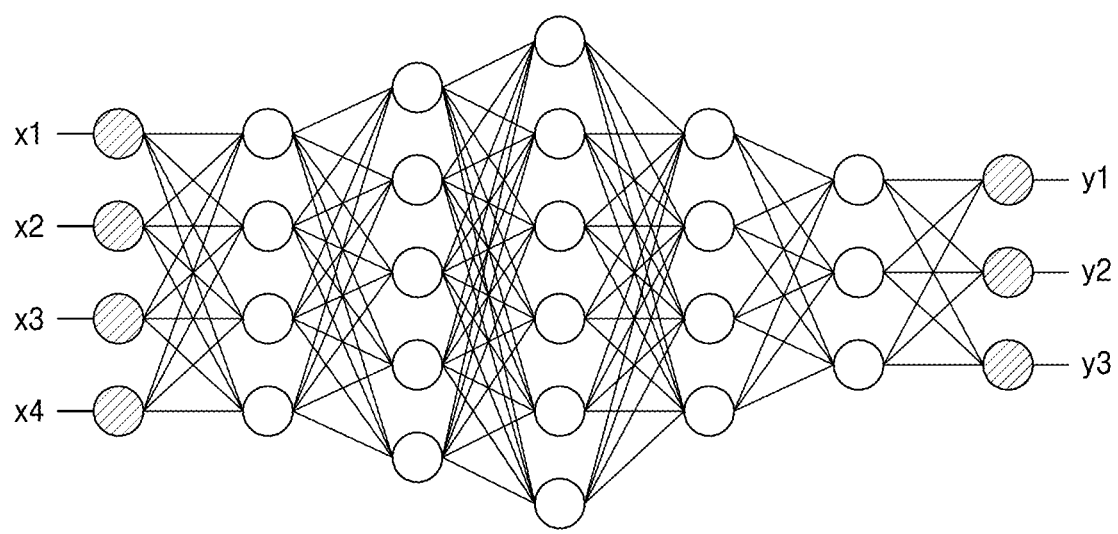
FIGS. 1A and 1B are conceptual diagrams illustrating the concept of multiplication and accumulation operations and an active function in a neural network.
Figure 1B:
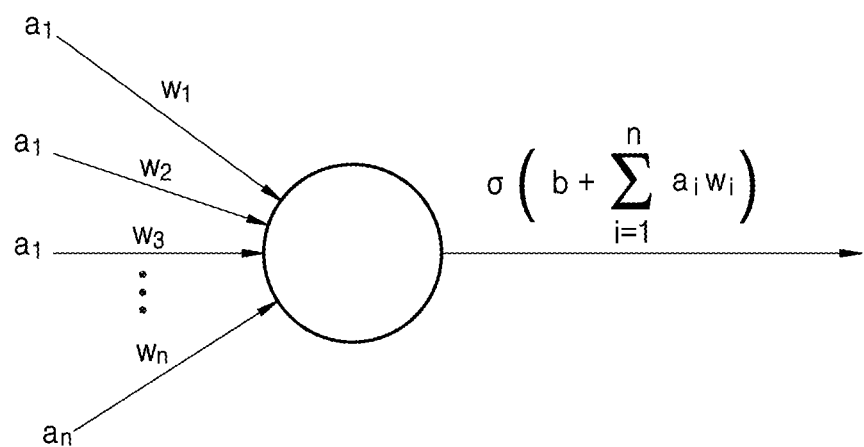
Figure 2:
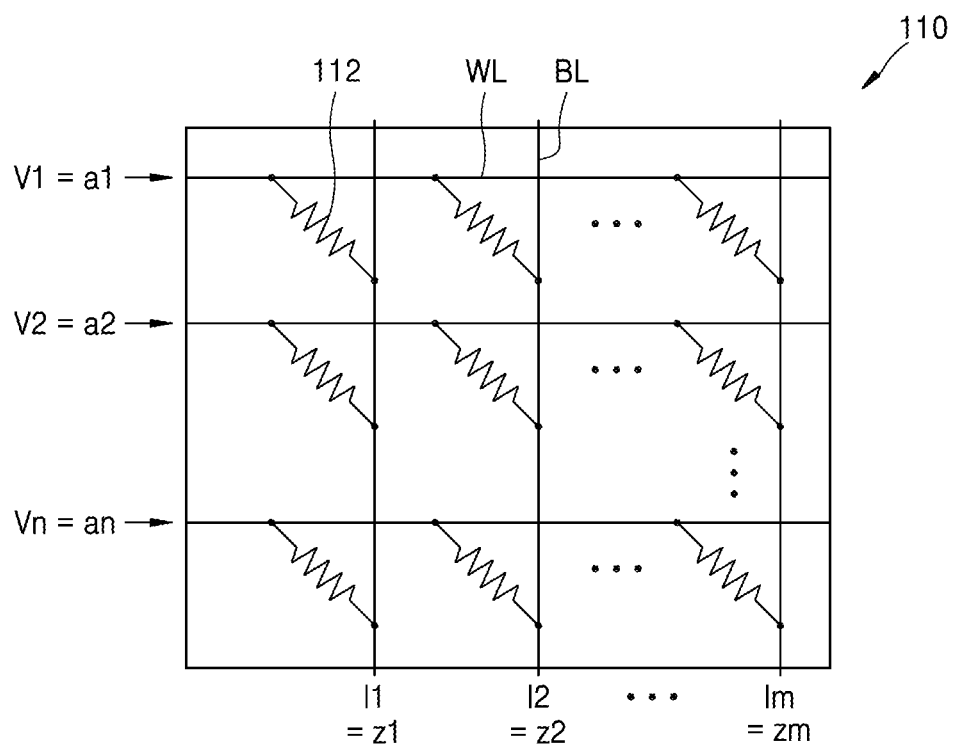
FIG. 2 is a conceptual diagram illustrating a structure of a crossbar array corresponding to weights.

FIGS. 1A and 1B are conceptual diagrams illustrating the concept of multiplication and accumulation operations and an active function in a neural network, and FIG. 2 is a conceptual diagram illustrating a structure of a crossbar array corresponding to a weight value.

Referring to FIGS. 1A, 1B, and 2, a neural network may include an operation of multiplying input values by weights and accumulating the multiplication results and an active function. FIG. 1A illustrates a shape of the neural network. The neural network may commonly include an input layer hatched on the left, an output layer hatched on the right, and a plurality of hidden layers arranged between the input layer and the output layer. Input values input to each of the layers may be multiplied by the weights and accumulated and may be activated through the active function. Such a process is represented by the equation in FIG. 1B. In FIG. 1B, ai may represent the input values and wi may represent the weights. Here, b represents a bias. One of various functions may be used as an active function a. Representatively, a sigmoid function or a rectified linear units (ReLU) function may be used as the active function a. The active function a and the present disclosure are not limited to the above functions.

In some embodiments, the weights may be in a matrix, and the weights may be represented as a crossbar array 110 including cells of resistance memory devices 112, as illustrated in FIG. 2. Here, each of the resistance memory devices 112 may be implemented by, for example, resistive random access memory (RRAIVI), magnetic random access memory (MRAM), phase-change random access memory (PRAM), or ferroelectric random access memory (FeRAM). However, the resistance memory devices 112 and the present disclosure are not limited to the above memories. In some embodiments, in FIG. 2, a cell transistor may be omitted. Hereinafter, the crossbar array 110 may be a hardware concept including the cells of the resistance memory devices 112, and a crossbar array matrix representing the crossbar array 110 may be a mathematical concept related to an operation or a function of the crossbar array 110.

An operation of the crossbar array 110 may be described with voltages and currents. When input values corresponding to the voltages are input to word lines WL of the crossbar array 110, output values corresponding to the currents are output to bit lines BL. The currents of the output values may correspond to results of the multiplication and accumulation operations performed by the neural network. The operation of the crossbar array 110 is represented by Equation 1, as follows.

$$Im \times \tau Gmn Vn \qquad (1)$$

In Equation 1, Im represents the currents that are the output values, Vn represents the voltages that are the input values, and Gmn represents conductances. In Equation 1, m and n are natural numbers that may correspond respectively to the number of output values and the number of input values.

Equation 1 may be represented by in the concept of a matrix as seen in Equation 2, as follows.

$$z = W * a \qquad (2)$$

In Equation 2, a may represent an n×1 column matrix, W may represent an m×n matrix, and z may represent an m×1 column matrix. In connection with Equation 2, components of a may correspond to the voltages that are the input values, components of z may correspond to the currents that are the output values, and components of W may correspond to conductances.

Figure 3A:
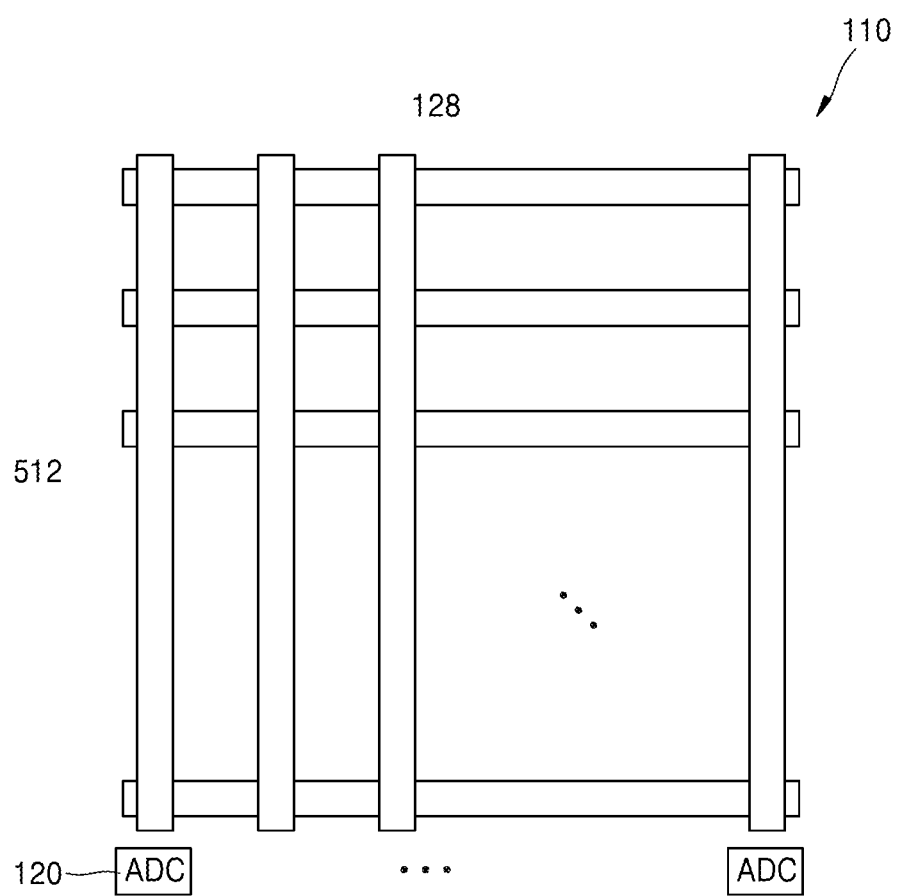
FIGS. 3A to 3C are conceptual diagrams illustrating array partitioning.

When weight matrix is mapped to the crossbar array 110 a size of the weight matrix may be very large, and high precision may be required when the multiplication and accumulation operation results are to be converted from analog to digital through an analog-to-digital converter (ADC) (refer to 120 of FIG. 3A). On the other hand, an area of an ADC circuit may rapidly increase and the performance of the ADC circuit may be rapidly reduced as the precision of the ADC increases, it may be desirable or even necessary to maintain the precision of the ADC to be at no more than a uniform level, for example, about several bits. Therefore, a weight matrix with a large size may not be calculated as it is, and array partitioning may be performed so that the weight matrix with the large size may be partitioned into a plurality of weight matrices with small sizes. Array partitioning of a weight matrix will be described in more detail with reference to FIGS. 3A, 3B, and 3C.

Figure 3B:
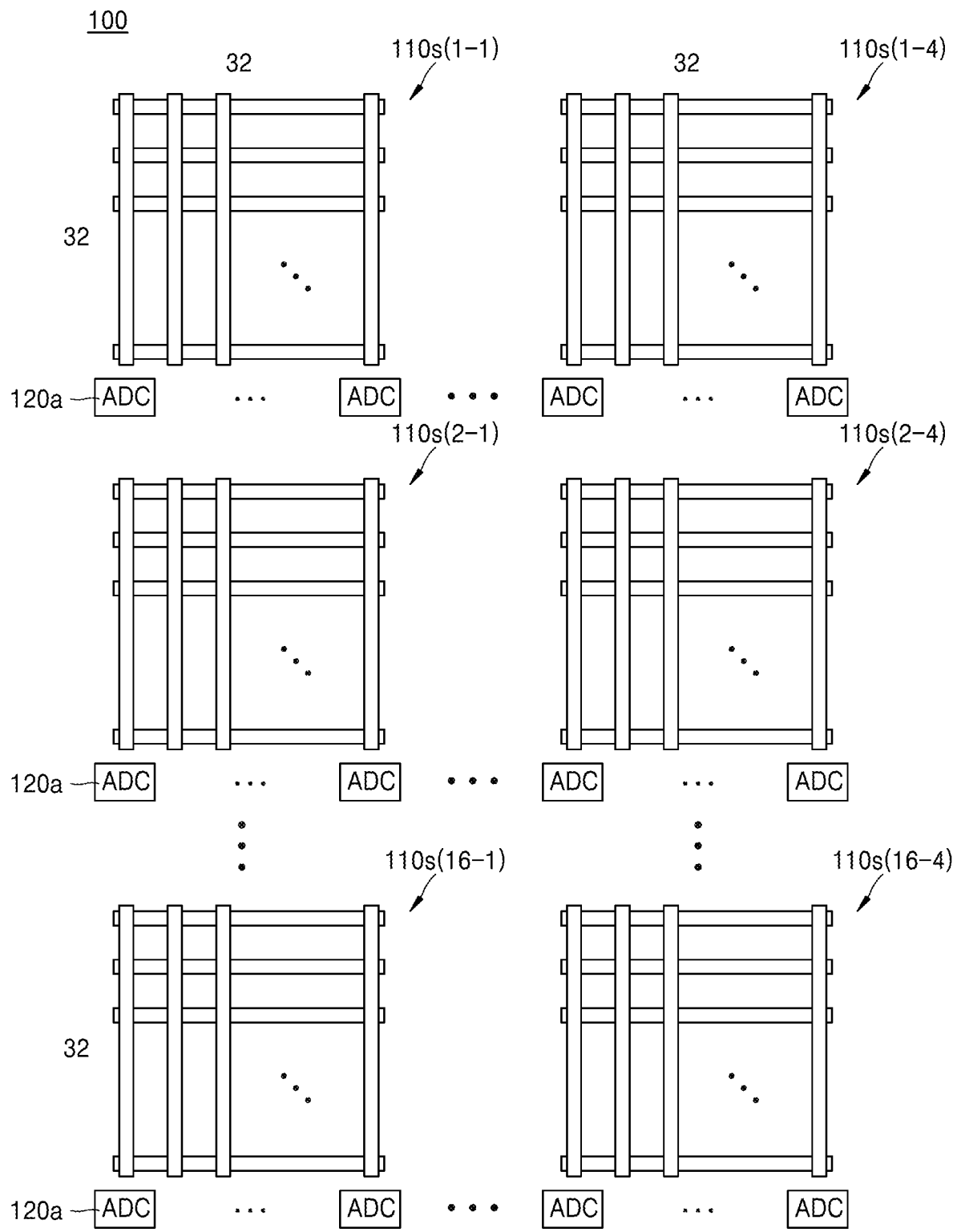
Figure 3C:
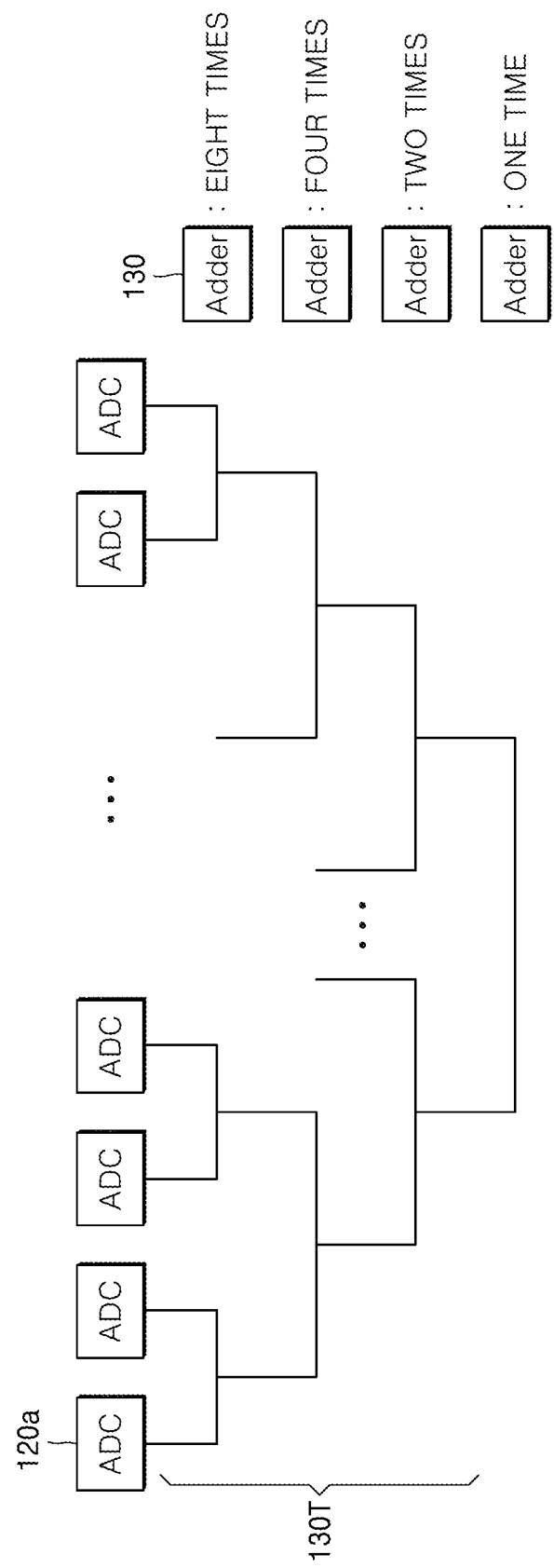

FIGS. 3A to 3C are conceptual diagrams illustrating array partitioning.

Referring to FIGS. 3A to 3C, when the multiplication and accumulation operation results in the crossbar array 110 corresponding to a weight matrix with a size of 512×128 are to be converted by using an ADC 120a of, for example, no more than 5 bits, the weight matrix with the size of 512×128 may be partitioned into 64 sub-arrays 110a with a size of 32×32 and the multiplication and accumulation operations may be performed. In addition, the ADC results of each of the sub-arrays may be summed up through an adder tree 130T including adders 130.

In greater detail, when the crossbar array 110 corresponding to the weight matrix with the size of 512×128 is partitioned into the sub-arrays with the size of 32×32, the number of sub-arrays may be 512/32*128/32=16*4=64. In addition, when AD conversion is performed by the ADC 120a on columns of each of the sub-arrays, the number of operations of the ADC 120a may be 64*32=2048. When the results of the ADC 120a are summed up through the adders 130, 16 ADC results may be obtained for one column. As noted from FIG. 3C, summing up may be performed eight times in a first step, four times in a second step, two times in a third step, and one time in a fourth step. Therefore, for one column, summing up may be performed by the adders 130 15 times. Additionally, as the number of columns is 32*4, the number of summing up operations performed by the adders 130 may be 15*32*4=1920. When the steps of the summing up are referred to as stages of the adders 130, the number of stages of the adders 130 may be 4. As described above, the adders 130 may configure the adder tree in the form of a plurality of stages. As a result, a total operating current may be calculated as 512*128=64*32*32=65536 times a cell current.

When a size of the ADC 120a is large, it may be difficult to arrange one ADC 120a in each column, and one ADC 120a may commonly perform AD conversion for multiple columns by using a multiplexer MUX. One adder 130 may be arranged in each of the stages of the adder tree 130T so that the summing up may be performed. However, according to some embodiments, various numbers of adders 130 may be arranged in each stage.

The following TABLE 1 illustrates equations of the number of sub-arrays # of sub-arrays, the number of operations of an ADC # of ADCs, the number of operations of adders # of additions, the number of adder stages # of adder stages, and operation currents # of cell currents by generalizing a size of a matrix of the crossbar array.

TABLE 1

| weight | m × n | 512 × 128 |
|---|---|---|
| cell/weight_element | b | 1 |
| sub-array size | s × s | 32 × 32 |
| # of sub-arrays | Ns = ceil(m/s) * ceil(n/s) * b | 16 * 4 * 1 = 64 |
| # of ADCs | Ns * s | 64 * 32 = 2048 |
| # of additions | {Ns − ceil(n/s) * b} * s | {64 − 4} * 32 = 1920 |
| # of adder stages | ceil($\log_2$ ceil(m/s)) | 4 |
| # of cell currents | Ns * s * s | 64 * 32 * 32 = 65536 |

In Table 1, a weight represents a size of a matrix of an original crossbar array, and b means the number of cells required per weight element. For example, in a case in which the weight element is 8 bits, when a cell is a single level cell (SLC) of 1 bit, b is 8; in a case when a cell is a multilevel cell of 2 bits, b is 4; and in a case when a cell is a quad level cell of 4 bits, b is 2. On the other hand, when a cell is a triple level cell (TLC) of 3 bits, because b=8/3=2.xx, which is not an integer, b may not be commonly considered. However, if b is to be considered, b may be represented as eight TLCs by binding three weight elements. For reference, in TABLE 1, b may be calculated as 1.

Herein, ceil( ) is a roundup function (or ceiling function) and ceil(x) represents a minimum integer of no less than x. The number of operations of the adders 130 may be induced as {ceil(m/s)−1}*ceil(n/s)*b*s=ceil(m/s)*ceil(n/s)*b*s−ceil(n/s)*b*s=Ns*s−ceil(n/s)*b*s={Ns−ceil(n/s)*b}*s.

A crossbar array apparatus 100 according to some embodiments of the inventive concepts may reduce (and in some embodiments may remarkably reduce) the number of sub-arrays by decomposing the crossbar array 110 into several partial crossbar arrays (refer to 110a of FIG. 4B or 110b of FIG. 8B) and partitioning each of the partial crossbar arrays into sub-arrays 110s through array partitioning, instead of directly partitioning the crossbar array 110 into the sub-arrays 110s through array partitioning. In addition, the crossbar array apparatus 100 according to some embodiments of the inventive concepts may reduce the number of operations of the ADC, the number of operations of the adders, the number of stages of the adders, and the operating current by reducing the number of sub-arrays. Hereinafter, in FIGS. 4A and 4B, a method of decomposing the crossbar array into the partial crossbar arrays will be described in more detail.

Figure 4A:
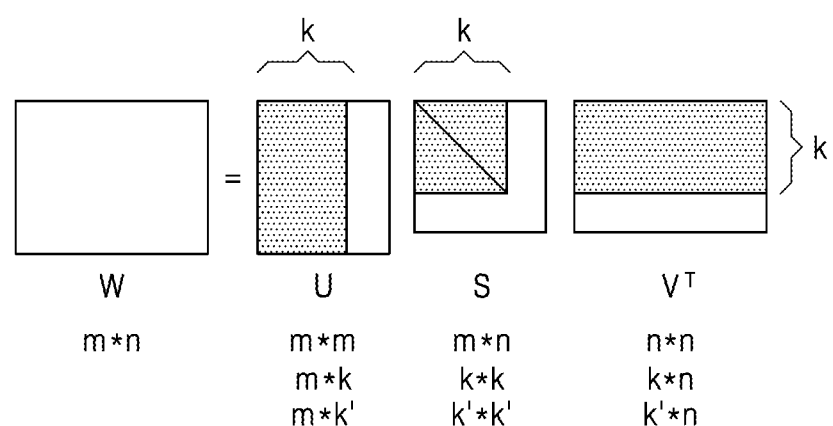
FIGS. 4A and 4B are conceptual diagrams illustrating the concept of partitioning an original crossbar array into partial crossbar arrays based on singular value decomposition (SVD) and truncated singular value decomposition (TSVD)
Figure 4B:
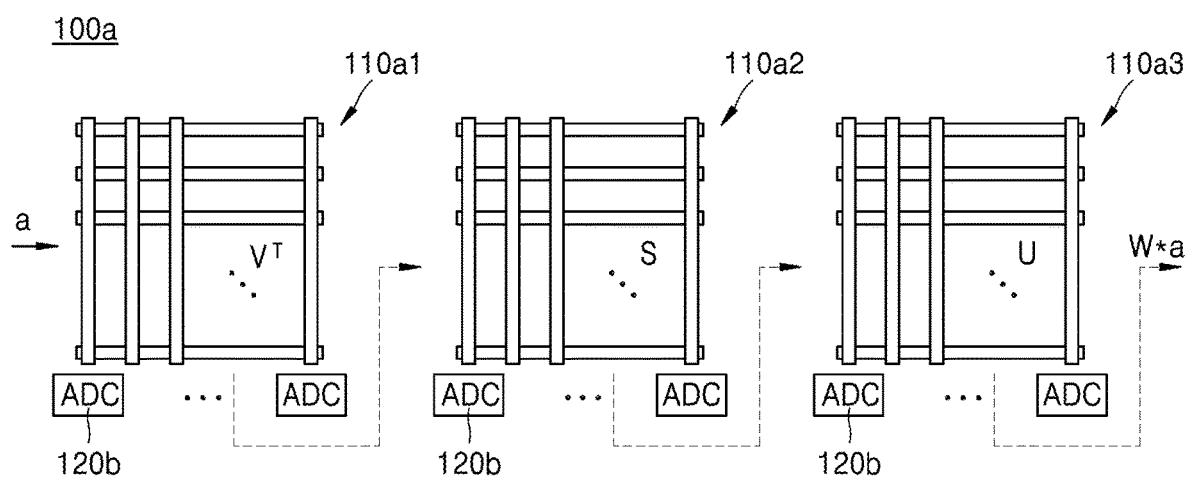

FIGS. 4A and 4B are conceptual diagrams illustrating the concept of decomposing an original crossbar array into partial crossbar arrays based on singular value decomposition (SVD) and truncated singular value decomposition (TSVD) adopted in a crossbar array apparatus according to some embodiments of the inventive concepts.

Referring to FIGS. 4A and 4B, in accordance with a linear algebra, a matrix W with a size of m×n may be represented as a multiplication of three matrices U, S, and $V^T$ through SVD. The matrix U may have a size of m×m, the matrix S may have the size of m×n, and the matrix $V^T$ may have a size of n×n. In addition, in the matrix S, only diagonal matrix components may have values that are not 0. When a rank of the matrix W is k, there are k diagonal matrix components that are not 0 in the matrix S. Therefore, the matrices U, S, and $V^T$ may be respectively reduced to matrices with sizes of m×k, k×k, and k×n. Although such a reduction is performed, a value of the matrix W may not be affected.

The rank k is no more than minimum values of m and n. That is, the rank k is no more than a smaller value of m and n. At this time, when only a part is selected from the diagonal matrix components of the matrix S in large order, k may be reduced. When k is reduced by selecting a part of the diagonal matrix components, the matrix W may become an approximation, which is referred to as TSVD. When the TSVD is not applied, the matrix W may be implemented by array partitioned 1 stage. When the TSVD is applied, because the three matrices U, S, and $V^T$ must be implemented, the matrix W may be implemented by array partitioned 3 stages. When the matrix W is implemented by array partitioned 3 stages, the size of the matrix W may be remarkably reduced.

In FIG. 4A, when the matrix W is partitioned into the three matrices U, S, and $V^T$ and the rank of the matrix W is k, the matrices U, S, and $V^T$ may be reduced to matrices with the sizes of m×k, k×k, and k×n, respectively. In addition, when a part is selected from the diagonal matrix components of the matrix S in large order and k is reduced to k' (k'≤k), the matrices U, S, and $V^T$ may be further reduced to matrices with sizes of m×k', k'×k', and k'×n, respectively.

In FIG. 4B, first, second, and third partial crossbar arrays 110a1, 110a2, and 110a3 respectively corresponding to the matrices U, S, and $V^T$ are illustrated. Operations of the partial crossbar arrays 110a1, 110a2, and 110a3 will be described herein. Components of a column matrix a may be input to input lines of the first partial crossbar array 110a1 corresponding to the matrix $V^T$ as input values and may be output as output values of output lines. The output values from the first partial crossbar array 110a1 may be input to input lines of the second partial crossbar array 110a2 corresponding to the matrix S as input values and may be output as output values of output lines. The output values from the second partial crossbar array 110a2 may be input to input lines of the third partial crossbar array 110a3 corresponding to the matrix U as input values and may be output as output values of output lines. As a result, the output values of the third partial crossbar array 110a3 corresponding to the matrix U may be actually equal to W*a obtained by inputting the components of the column matrix a to the input lines of the crossbar array 100a corresponding to the matrix W as the input values and outputting the components of the column matrix a to the output lines.

Each of the partial crossbar arrays 110a1, 110a2, and 110a3 may be partitioned into sub-arrays through array partitioning like the crossbar array 100a. In FIG. 4B, the array partitioning is omitted and only three stages corresponding to the partial crossbar arrays 110a1, 110a2, and 110a3 are represented.

In order to actually use the TSVD, two matters need to be considered. The first is acceptability of the deterioration of inference precision of a neuron network, which may be caused by replacing the matrix W by an approximation. The second is that an advantage caused by reduction in size of a matrix should be greater, and preferably much greater, than a disadvantage caused by 3-stage implementation. The inference precision will be described with reference to FIGS. 5A to 6 and the advantage caused by the reduction in size of the matrix will be described with reference to FIGS. 8A and 8B.

FIGS. 5A and 5B are graphs arranging diagonal matrix components of a matrix S in order to size by applying TSVD. The x axis represents indices of the diagonal matrix components of the matrix S and the y axis represents singular values.

Referring to FIGS. 5A and 5B, after learning a 784-512-128-10 deep neural network (DNN) for classification of handwritten digits using the Modified National Institute of Standards and Technology database (MNIST database), the diagonal matrix components of the matrix S may be arranged in large order by applying the TSVD for a 784-512 weight matrix W of a first layer L1 in FIG. 5A and for a 512-128 weight matrix W of a second layer L2 in FIG. 5B.

A regularization term may be divided by a regularization parameter during learning. As regularization is reinforced, matrix components close to 0 may increase so that it may be estimated that the approximation of the matrix W is closer to a true value of the matrix W when the same number of components are taken. Describing in more detail, in FIGS. 5A and 5B, the diagonal matrix components when regularization parameters may be 0.0, 0.05, 0.10, 0.20, and 0.50 are illustrated. As the regularization parameters increase, most singular values corresponding to high indices become 0. Therefore, when regularization is reinforced by selecting a large value such as 0.20 or 0.50 as a regularization parameter, although a part, for example, several decades of the diagonal matrix components may be taken, it may be estimated that the approximation of the matrix W does not remarkably deviate from the true value of the matrix W.

For reference, regularization as one of DNN learning methods of reducing over-fitting by reducing the number of weight matrix components may be more widely used as a size of the DNN increases. The regularization parameter may correspond to a hyper parameter of the regularization term introduced in order to prevent over-fitting when learning is performed so that loss is minimized with the concept of a loss function or a cost function. For example, the regularization parameter may correspond to the hyper parameter of the regularization term used for ridge regression, least absolute shrinkage and selection operator (LASSO) regression, or elastic net regression, although the present disclosure is not limited thereto.

FIG. 6 is a graph illustrating inference accuracy in accordance with a taken ratio among diagonal matrix components of a matrix S. The x axis represents a taken ratio, the y axis represents inference accuracy, and both of the x and y axes have no units.

Referring to FIG. 6, the taken ratio may be defined as k'/(m or n) that is a ratio of the number k' of selected diagonal matrix components for the number m or n of diagonal matrix components of the matrix S or k'/(m or n)*100 that is a percentage. In the graph of FIG. 6, the taken ratio in the x axis may be represented as k'/(m or n) and may be divided by a regularization parameter. It may be noted from the graph of FIG. 6 that, excluding a case in which the regularization parameter is 0.00, inference accuracy may correspond to no less than 0.9 in a taken ratio of no more than 0.1. Therefore, although a taken ratio is no more than 10% under regularization by a predetermined regularization parameter, inference accuracy may not be significantly affected.

The following TABLE 2 illustrates inference accuracy in accordance with a regularization parameter and a taken ratio, 'trained' illustrates inference accuracy by the original crossbar array matrix W calculated through learning, and 'TSVD' illustrates inference accuracy by matrices partitioned through TSVD.

TABLE 2

| regularization | trained | TSVD | taken ratio |
| --- | --- | --- | --- |
| 0.00 | 0.98 | 0.98 | 0.66 |
| 0.05 | 0.98 | 0.98 | 0.68 |
| 0.10 | 0.97 | 0.97 | 0.06 |
| 0.20 | 0.97 | 0.97 | 0.08 |
| 0.50 | 0.94 | 0.94 | 0.06 |

It may be noted from TABLE 2 that, although the taken ratio is no more than 10% in the regularization parameters 0.10 and 0.20, there is little loss of inference accuracy.

FIGS. 7A and 7B are flowcharts schematically illustrating two learning methods in relation to influence of a regulatory parameter on inference accuracy in accordance with a taken ratio. FIG. 7A is a flowchart illustrating a learning method in which inference accuracy is affected by a regularization parameter, and FIG. 7B is a flowchart illustrating a learning method in which inference accuracy is not affected by a regularization parameter.

Referring to FIG. 7A, first, a matrix of an original crossbar array may be calculated through learning in operation S110. In the learning, a regularization term for preventing over-fitting may be included. Next, the original crossbar array may be partitioned into partial crossbar arrays through SVD in operation S130. Then, k' components that are a part of k components of a matrix S may be selected in operation S150. Here, selecting the k' components may include taking the taken ratio, which may mean decomposing the matrix of the original crossbar array into matrices of the partial crossbar arrays through TSVD. In addition, the performing of the TSVD may include partitioning each of the partial arrays into sub-arrays through array partitioning.

Then, inference may be performed in operation S170. The inference may mean extracting an output value by inputting a new input value to a weight matrix and the weight matrix may mean the matrices of the partial crossbar arrays obtained through the TSVD and matrices of sub-arrays for the matrices of the partial crossbar arrays. Inference accuracy may be determined based on how much the output value is similar to a true value, and may be based on comparing the output value with the true value. As described above, when the learning method illustrated in FIG. 7A is performed, inference accuracy in accordance with the taken ratio, that is, k'/(m or n), may be affected by the regularization parameter of the regularization term used for learning. Therefore, when a low taken ratio is to be taken, a proper regularization parameter may be selected.

Referring to FIG. 7B, first, a matrix of an arbitrary first original crossbar array may be selected in operation S210. Next, the matrix of the first original crossbar array may be partitioned into matrices of partial crossbar arrays through SVD in operation S230. Then, k' components that are a part of k components of a matrix S may be selected in operation S250. Selecting the k' components may include taking the taken ratio, which may mean partitioning the matrix of the first original crossbar array into the matrices of the partial crossbar arrays through TSVD.

Then, learning may be performed with a matrix of a second original crossbar array in operation S270. Here, the matrix of the second original crossbar array may correspond to a matrix obtained by integrating the matrices of the partial crossbar arrays including the k' components and may be different from the matrix of the first original crossbar array. Through learning, a matrix of a new original crossbar array may be calculated. In addition, in the learning, a regularization term for preventing over-fitting may be included.

Then, inference may be performed in operation S290. In some embodiments, before performing the inference, operations S130 to S150 of FIG. 7A may be further included. When the learning method illustrated in FIG. 7B is performed, inference accuracy in accordance with the taken ratio, that is, k'/(m or n), may not be significantly affected by the regularization parameter of the regularization term. Therefore, in the learning method of FIG. 7B, the taken ratio may be taken regardless of the regularization parameter.

FIGS. 8A and 8B are conceptual diagrams illustrating the concept of partitioning an original crossbar array into partial crossbar arrays based on compressed-truncated singular value decomposition (C-TSVD) adopted in a crossbar array apparatus 100b according to some embodiments of the inventive concepts.

Referring to FIGS. 8A and 8B, as described above, because three matrices may be used in the TSVD method, 3 stages may be configured by three partial crossbar arrays. Instead of using the matrix S and the matrix $V^T$ like in FIGS. 8A and 8B, when multiplication $S*V^T$ of two matrices is used, the number of stages may be reduced to 2 while reducing a size of a matrix. Such a method may be referred to as compressed-TSVD (C-TSVD) and may be adopted to the crossbar array apparatus 100b. In the crossbar array apparatus 100b according to some embodiments, an advantage caused by reduction in size of the matrix through 2-stage implementation will be described as follows.

First, the number of sub-arrays may be calculated as follows. When a matrix W of an original crossbar array has a size of m×n and is implemented by 1 stage, the number of sub-arrays is Ns(W)=ceil(m/s)*ceil(n/s)*b. Therefore, when the matrix W of the original crossbar array has a size of 512×128, Ns(W)=16*4*1=64.

On the other hand, when 2 stages are implemented through C-TSVD, the number of sub-arrays is Ns(Wt)=Nu+Nv=ceil(m/s)*ceil(k/s)*b+ceil(k/s)*ceil(n/s)*b. Here, Nu means the number of sub-arrays of a matrix U and Nv means the number of sub-arrays of a matrix $S*V^T$. When the matrix W of the original crossbar array has the size of 512×128 and has a taken ratio of 10%, Ns(Wt)=16+4=20. For reference, because the taken ratio is 10%, k'=128*0.1=12.8 and is less than 32. Therefore, when k is replaced by k', ceil(k/s) is 1.

When the taken ratio is reduced so that k' is no more than a half of m or n, it may be estimated that the number of sub-arrays is reduced in array partitioning. For example, when the taken ratio is taken to be less than 0.5, in general, Ns(Wt) is less than Ns(W), the number of operations of an ADC and adders may be reduced, and an operating current may be reduced. In TABLE 3, the number of sub-arrays, the number of operations of the ADC, the number of operations of the adders, the number of adder stages, and the operating current in a case in which the taken ratio is 10% will be comparatively illustrated.

TABLE 3

| | 512 × 128 | | |
|---|---|---|---|
| weight | original(SVD) | C-TSVD | C-TSVD/ original |
| cell/weight | 1 | 1 | |
| sub-array size | 32 × 32 | 32 × 32 | |
| # of sub-arrays | 16 * 4 * 1 = 64 | 16 + 4 = 20 | 0.31 |
| # of ADCs | 64 * 32 = 2048 | 20 * 32 = 640 | 0.31 |
| # of additions | {64 − 4} * 32 = 1920 | (20 − (4 + 1))) * 32 = 480 | 0.25 |
| # of adder stages | 4 | 4 | 1 |
| # of cell currents | 64 * 32 * 32 = 65536 | 20 * 32 * 32 = 20480 | 0.31 |

For reference, when the 2 stages are implemented through the C-TSVD, the number of operations of the ADC, the number of operations of the adders, the number of adder stages, and the operating current are respectively represented as Ns(Wt)*s, {Ns(Wt)−(ceil(k/s)+ceil(n/s))*b}*s, ceil(log$_2$ ceil(m/s)), and Ns(Wt)*s*s. Therefore, the resultant values illustrated in TABLE 3 may be derived.

It may be noted from TABLE 3 that, excluding the number of adder stages, the number of sub-arrays, the number of operations of the ADC, and the operating current are reduced to 31% and the number of operations of the adders are reduced to 25%. Reduction in operating current may result in a corresponding reduction in energy, which may mean that power is further reduced as the number of stages increases from the 1 stage to the 2 stages.

In general, as a size of a matrix increases, such a degree of reduction may further increase. That is, as a size of a matrix increases, power may be further reduced. TABLE 4 illustrates ratios at which the number of sub-arrays, the number of operations of the ADC, and the operating current are reduced while a size of a matrix increases. As noted from TABLE 3, because the reduction ratios are the same for each of these parameters, in TABLE 4, the reduction ratios may be represented by one value.

TABLE 4

| m\n | 512 | 256 | 128 | 64 | 32 |
|---|---|---|---|---|---|
| 512 | 0.25 | 0.19 | 0.31 | 0.56 | 1.06 |
| 256 | 0.19 | 0.25 | 0.38 | 0.63 | 1.13 |
| 128 | 0.31 | 0.38 | 0.50 | 0.75 | 1.25 |
| 64 | 0.56 | 0.63 | 0.75 | 1.00 | 1.50 |
| 32 | 1.03 | 1.13 | 1.25 | 1.50 | 2.00 |

It may be noted from TABLE 4 that, as the size of the matrix of the original crossbar array increases, the value of the reduction ratio may be reduced. In calculation by the taken ratio of 10%, for 256, 256*0.1=25.6 is calculated as one sub-array and, for 512, 512*0.1=51.2 may be calculated as two sub-arrays.

FIGS. 9A and 9B are conceptual diagrams illustrating that a crossbar array apparatus according to some embodiments may be applied to layers of a neural network in neuromorphic computing.

Referring to FIGS. 9A and 9B, FIG. 9A illustrates a method (hereinafter, referred to as 'an original method') of processing a matrix W of original crossbar arrays 100-1 and 100-2 in layers Layer 1 and Layer 2 and inputting an output of the matrix W to a next layer. As illustrated in FIG. 9A, in the layers Layer 1 and Layer 2, the original crossbar arrays 100-1 and 100-2 may be partitioned into sub-arrays through array partitioning.

FIG. 9B illustrates a method (hereinafter, referred to as 'a C-TSVD method') of processing matrices of partial crossbar arrays 100b1 and 100b2 configuring 2 stages in layers Layer 1 and Layer 2 and inputting an output of a current layer to a next layer. The matrices of the partial crossbar arrays 100b1 and 100b2 may be generated through the C-TSVD as described with reference to FIGS. 8A and 8B. In addition, as illustrated in FIG. 9B, in the respective stages, the partial crossbar arrays 100b1 and 100b2 may be partitioned into sub-arrays through array partitioning.

In the original method, in the last step of each layer, activation may be performed by an activation function circuit 140 such as a rectified linear unit (Relu). That is, an output value of the adder tree 130T may be activated by the activation function circuit 140. On the other hand, in the C-TSVD method, because each layer is operated while being divided into a matrix $SV^T$ and a matrix U, an output from the matrix $SV^T$ may be transmitted to the matrix U as it is. Therefore, an identity function circuit 160 may be arranged in the last step of the matrix $SV^T$ so that the output value of the matrix $SV^T$, that is, an output value of an adder tree 130T1, may be input to the matrix U as it is. In addition, in the last step of the matrix U, which may be the last step of each layer, like in the original method, an activation function circuit 140a may be arranged so that activation may be performed. That is, an output value of an adder tree 130T2 may be activated by the activation function circuit 140a.

On the other hand, in order to let a user select the original method or the C-TSVD method, an identity function may be implemented in the activation function circuit and setting is to be performed by a controller 150 during mapping. By doing so, when it may be difficult to allow even slight accuracy loss and latency loss accompanied by application of the C-TSVD method, the original method may be mapped and used by using the controller 150. In other words, the user may selectively apply the original method or the C-TSVD method.

The following TABLE 5 illustrates equations for calculating latency of the 1 stage of the original method and latency of the 2 stages of the C-TSVD method when the matrix of the original crossbar array has the size of m×n. Here, the latency may mean a time spent on performing an operation of a corresponding method.

TABLE 5

| step | parallelism | time(m × n) | time(k × n + m × k) |
|---|---|---|---|
| cell read | all cells | t_cell | t_cell |
| q-bitADC | p_mux bit lines/ADC | t_ADC = s * (t_mux + t_sa * ($2^q$ − 1)) | t_ADC = s * t_mux + t_sa * ($2^q$ − 1)) + s * (t_mux + t_sa * ($2^q$ − 1)) |
| adder tree | p_at bit lines/adder tree | t_at = ceil($\log_2$ ceil(m/s)) * ceil(n/s) * s/p_at * cycles_at | t_at = ceil($\log_2$ ceil(k/s)) * ceil(n/s) * s/p_at * cycles_at + ceil($\log_2$ ceil(m/s))) * ceil(n/s) * s /p_at * cycles_at |
| activation | p_ac bit lines/activation | t_ac = ceil(n/s) * s/p_ac * cycles_ac | t_ac = ceil(n/s) s) * s/p_ac * cycles_ac + ceil(k/s) * s/ p_ac * cycles_ac |
| total | | t_cell + t_ADC + t_at + t_ac | t_cell + t_ADC + t_at + t_ac |

Here, cell read as a time spent on reading one cell may mean a time t_cell immediately before a current reading a cell is input to a sense amplifier (S/A) and starts to determine 0/1. In addition, because all cells may be simultaneously read, it also takes t_cell to read all the cells.

Next, q-bit ADC may be determined by inputting $2^q$−1 references when the precision of the ADC is q-bit. When it takes t_sa for S/A to determine 0/1 per one reference, it may take t_sa*($2^q$−1) to output 0 or 1 for all references. Because the ADC has a large size, it may be difficult to provide the ADC in each bit line (or a column of a sub-array). Therefore, when one ADC is allocated to p_mux bit lines and it takes t_mux to change a bit line connected to the ADC, it may take t_mux+t_sa*($2^q$−1) for one bit line. In addition, because s bit lines are provided per sub-array, it may take s*(t_mux+ t_sa*($2^q$ 1) for one sub-array. On the other hand, assuming that all the sub-arrays respectively have ADC circuits and simultaneously perform ADC, the ADC time of all the sub-arrays may be the same as an ADC time of one sub-array.

Each of the ADC results may be sent to the adder tree in order to sum up them when ADC is performed in each sub-array. At this time, the adder tree includes ceil($\log_2$ ceil(m/s)) stages as described above. When the number of bit lines that may be processed by each stage at one time is p_at and a clock cycles_at is needed to process one bit line, it may take s/p_at*cycles_at for one sub-array to perform one stage of the adder tree. Because ceil(n/s) sub-arrays are provided in one array in a column direction, it may take ceil(n/s)*(s/ p_at)*cycles_at for all the arrays to perform one stage of the adder tree. When the number of stages is multiplied, it may take ceil($\log_2$ ceil(m/s))*ceil(n/s)*(s/p_at)*cycles_at to perform the adder tree.

Activation may mean a time spent on performing activation after the adder tree is performed. When the number of bit lines that may be activated at one time is p_ac, it may take s/p_ac*cycles_ac per sub-array in one array. Because ceil (n/s) sub-arrays are provided in one array in a column direction, it may take ceil(n/s)*s/p_ac*cycles_ac for all the arrays.

Finally, in the C-TSVD method, because the matrix with the size m×n is partitioned into two matrices respectively having sizes k×n and m×k, corresponding times may be obtained for the respective matrices and summed up by the above-described method.

TABLE 6 illustrates a latency increase ratio of the 2 stages in the C-TSVD method to the 1 stage in the original method when the taken ratio is taken as 10% in various sizes of the matrix of the original crossbar array.

TABLE 6

| m\n | 512 | 256 | 128 | 64 | 32 |
|---|---|---|---|---|---|
| 512 | 1.09 | 1.08 | 1.20 | 1.44 | 1.91 |
| 256 | 1.02 | 1.08 | 1.21 | 1.45 | 1.92 |
| 128 | 1.04 | 1.10 | 1.22 | 1.47 | 1.95 |
| 64 | 1.05 | 1.11 | 1.24 | 1.49 | 1.97 |
| 32 | 1.06 | 1.13 | 1.26 | 1.51 | 2.00 |

Here, t_cell is set as 10 ns, p_mux is set as 8, t_mux is set as 1 cycle, t_sa is set as 10 ns, q is set as 3 bits, each of p_at and p_ac is set as 8, cycles_at is set as 1 cycle, cycles_ac is set as 1 cycle, and a frequency is set as 1 GHz.

In general, as a size of a matrix increases, an increase ratio may be reduced. Therefore, even when the size of the matrix is no less than 256×256, the increase ratio may be no more than 9%, which is much less than the reduction ratios 69% (100%→31%) of the number of sub-arrays, the number of operations of the ADC, the number of operations of the adder, and the operating current, which is described above as an advantage. Therefore, when the deterioration of the inference accuracy and the deterioration of the latency are permitted to some degree, the crossbar array apparatus 100b according to some embodiments may adopt the configuration of the 2 stages of the C-TSVD method. However, when the deterioration of the inference accuracy and/or the deterioration of the latency are not permitted, the crossbar array apparatus 100b according to some embodiments may adopt the configuration of the 1 stage of the original method.

FIG. 10 is a flowchart illustrating an analog multiply-accumulate (MAC) operation method using a crossbar array apparatus according to some embodiments of the inventive concepts. Description previously given with reference to FIGS. 1A to 9B may be omitted in the interest of brevity.

Referring to FIG. 10, in the analog MAC operation method using the crossbar array apparatus according to some embodiments (hereinafter, referred to as 'the analog MAC operation method'), first, a matrix of an original crossbar array may be calculated through learning in operation S310. Next, it may be determined whether to perform C-TSVD in operation S320. That is, it may be determined whether to decompose the matrix of the original crossbar array into matrices of two partial crossbar arrays through the C-TSVD. It may be determined whether to perform the C-TSVD considering or based on the deterioration of the inference accuracy and/or the deterioration of the latency in comparison with the advantage in accordance with the reduction in the number of sub-arrays as described above.

When it is determined to perform the C-TSVD (Yes branch from operation S320), the matrix of the original crossbar array may be decomposed into the matrices of the two partial crossbar arrays through the C-TSVD in operation S330. Additionally, the two partial crossbar arrays may be partitioned into sub-arrays in operation S333. Otherwise, when the C-TSVD is not performed (No branch from operation S320), the original crossbar array may be partitioned into sub-arrays in operation S335.

Then, input values may be input to input lines of the sub-arrays in operation S340, multiplication and accumulation operations may be performed in each of the sub-arrays and output values of output lines may be output in operation S350, the output values may be AD converted through the ADC 120a in operation S360, and the results of the ADC 120a may be summed up through the adder tree 130T in operation S370. As described above, by summing up the results of the ADC 120a, the analog MAC operation method in one layer may be completed.

FIGS. 11A and 11B are flowcharts illustrating the analog MAC operation method of FIG. 10 in relation to a layer of a neural network in neuromorphic computing. Description previously given with reference to FIGS. 9A, 9B, and 10 may be omitted herein in the interest of brevity.

Referring to FIG. 11A, the analog MAC operation method according to some embodiments may schematically operate as illustrated in FIG. 9A, and may be performed by using the crossbar array apparatus 100a adopting the configuration of the 1 stage of the original method. In more detail, the matrix of the original crossbar array may be calculated through learning in operation S310, the original crossbar array may be partitioned into the sub-arrays in operation S335, the input values may be input to the input lines of the sub-arrays in operation S340, the multiplication and accumulation operations may be performed in each of the sub-arrays and the output values of the output lines are output in operation S350, the output values may be AD converted through the ADC 120a in operation S360, and the results of the ADC 120a may be summed up through the adder tree 130T in operation S370. Then, activation may be performed by the activation function circuit 140 and the activation result may be converted into an input value of a next layer in operation S380. Here, the next layer is illustrated as a second layer 2. However, the next layer is not limited to the second layer 2.

Referring to FIG. 11B, the analog MAC operation method according to some embodiments may schematically operate as illustrated in FIG. 9B, and may be performed by using the crossbar array apparatus 100b adopting the configuration of the 2 stages of the C-TSVD method. In more detail, the matrix of the original crossbar array may be calculated through learning in operation S310, the matrix of the original crossbar array may be decomposed into the matrices of the two partial crossbar arrays through the C-TSVD method in operation S330, the two partial crossbar arrays may be partitioned into the sub-arrays in operation S333, input values may be input to input lines of sub-arrays corresponding to the first partial crossbar array in operation S340a, the multiplication and accumulation operations may be performed in each of the sub-arrays and the output values of the output lines may be output in operation S350, the output values may be AD converted through the ADC 120a in operation S360, and the results of the ADC 120a may be summed up through the adder tree 130T in operation S370.

Then, the results of the adder tree 130T may be maintained through the identity function circuit 160 in operation S390, input values may be input to input lines of sub-arrays corresponding to the second partial crossbar array in operation S340b, the multiplication and accumulation operations may be performed in each of the sub-arrays and the output values of the output lines are output in operation S350, output values may be AD converted through the ADC 120a in operation S360, the results of the ADC 120a may be summed up through the adder tree 130T in operation S370, and activation may be performed by the activation function circuit 140a and the activation result may be converted into an input value of a next layer in operation S380.

While the inventive concepts have been particularly shown and described with reference to some embodiments thereof, it will be understood that various changes in form and details may be made therein without departing from the scope of the following claims.

What is claimed is:

1. A compressed-truncated singular value decomposition (C-TSVD) based crossbar array apparatus, comprising:
   an original crossbar array in an m×n matrix having n row input lines and m column output lines and including cells comprising resistance memory devices, or two partial crossbar arrays obtained by decomposing the original crossbar array based on C-TSVD, where m and n are natural numbers;
   an analog to digital converter (ADC) configured to convert output values of column output lines of sub-arrays obtained by partitioning the original crossbar array or the two partial crossbar arrays through array partitioning;
   an adder configured to sum up results of the ADC to correspond to the column output lines; and
   a controller configured to control application of the original crossbar array or the two partial crossbar arrays,
   wherein the C-TSVD based crossbar array apparatus corresponds to one layer of a neural network, and
   wherein input values are input to the row input lines, a weight is multiplied by the input values and accumulated results are output as output values of the column output lines, and the weight corresponds the original crossbar array or the two partial crossbar arrays.

2. The C-TSVD based crossbar array apparatus of claim 1, wherein a matrix W of the original crossbar array is partitioned into multiplication of three matrices U, S, and $V^T$ based on SVD so that the matrix U has a size of m×m, the matrix S has a size of m×n, and the matrix $V^T$ has a size of n×n,
   wherein, when a rank of the matrix W is k (k≤n & k≤m), the sizes of the matrices U, S, and $V^T$ are respectively reduced to m×k, k×k, and k×n and a number of components of the matrices U, S, and $V^T$ are further reduced to k' (k'≤k) via selection of at least partial components among the k components in large order based on TSVD, and
   wherein the two partial crossbar arrays comprise a first partial crossbar array and a second partial crossbar array, the first partial crossbar array represented as the matrix U and has a size of m×k, and the second partial crossbar array represented as a matrix $S*V^T$ and has a size of k×n.

3. The C-TSVD based crossbar array apparatus of claim 2, wherein, when a first case in which the original crossbar array is partitioned into the sub-arrays is compared with a second case in which the two partial crossbar arrays are partitioned into the sub-arrays,
   a number of sub-arrays of the second case, a number of operations of the ADC of the second case, a number of operations of the adder of the second case, and an operating current of the second case are less than those of the first case, and a number of adder stages of the first case is the same as a number of adder stages of the second case.

4. The C-TSVD based crossbar array apparatus of claim 3, wherein, for at least one of the number of sub-arrays, the number of operations of the ADC, the number of operations of the adder, and the operating current, as a size of a matrix of the original crossbar array increases, a reduction in the second case relative to the first case increases.

5. The C-TSVD based crossbar array apparatus of claim 3, wherein, when a matrix of the sub-arrays has a size of s×s, where s is a natural number,
   wherein in a third case in which the first partial crossbar array is partitioned into the sub-arrays, the number of sub-arrays is Nu=ceil(m/s)*ceil(k/s)*b,
   wherein in a fourth case in which the second partial crossbar array is partitioned into the sub-arrays, the number of sub-arrays is Nv=ceil(k/s)*ceil(n/s)*b, and
   wherein ceil(x) represents a minimum integer of no less than x, and b represents the number of cells required per weight element.

6. The C-TSVD based crossbar array apparatus of claim 5, wherein, in the first case, the number of sub-arrays is Ns(W)=ceil(m/s)*ceil(n/s)*b, and
   wherein, in the second case, the number of all sub-arrays is Ns(Wt)=Nu+Nv=ceil(m/s)*ceil(k/s)*b+ceil(k/s)*ceil(n/s)*b.

7. The C-TSVD based crossbar array apparatus of claim 6, wherein, in the first case, the number of operations of the ADC is Ns(W)*s,
   the number of operations of the adder is {Ns(W)−ceil(n/s)*b} *s,
   the number of adder stages is ceil(log 2 ceil(m/s)), and
   the operating current is Ns(W)*s*s times a cell current, and
   wherein, in the second case, the number of operations of the ADC is Ns(Wt)*s,
   the number of operations of the adder is {Ns(Wt)−(ceil (k/s)+ceil(n/s))*b} *s,
   the number of adder stages is ceil(log 2 ceil(m/s)), and
   the operating current is Ns(Wt)*s*s times a cell current.

8. The C-TSVD based crossbar array apparatus of claim 2, wherein, when k'/(m or n)*100 is a taken ratio, the crossbar array apparatus is configured to perform:
   in a first learning method in which, after calculating the original crossbar array through learning, inference is performed by decomposing the original crossbar array into partial crossbar arrays through the SVD and selecting the k', inference accuracy in accordance with the taken ratio is affected by a regularization parameter of a regularization term used for preventing over-fitting in the learning, and
   in a second learning method in which, after selecting an arbitrary first original crossbar array before learning and selecting the k' by decomposing the first original crossbar array into partial crossbar arrays through the SVD, inference is performed by learning an integrated second original crossbar array, inference accuracy in accordance with the taken ratio is less affected by the regularization parameter than in the first learning method.

9. The C-TSVD based crossbar array apparatus of claim 8, wherein the inference accuracy is maintained to be no less than 90%, and the taken ratio is taken to be no more than 10%, the crossbar array apparatus is configured to perform the second learning method or select a predetermined regularization parameter in the first learning method.

10. The C-TSVD based crossbar array apparatus of claim 2, wherein, when a time spent on performing an operation of the crossbar array apparatus based on the original crossbar array is 1-stage latency and a time spent on performing an operation of the crossbar array apparatus based on the two partial crossbar arrays is 2-stage latency, as a size of a matrix of the original crossbar array increases, increase in the 2-stage latency relative to the 1-stage latency decreases.

11. The C-TSVD based crossbar array apparatus of claim 2, further comprising:
   a first circuit of an identity function inputting an output of an adder tree of the first partial crossbar array to the second partial crossbar array as it is; and
   a second circuit of an activation function activating an output of an adder tree of the original crossbar array or an output of an adder tree of the second partial crossbar array and inputting the activated output to a next layer,
   wherein the adder tree including the adder is arranged in an output portion of the original crossbar array or an output portion of each of the first partial crossbar array and the second partial crossbar array.

12. The C-TSVD based crossbar array apparatus of claim 1, wherein the weight corresponds to conductance, the crossbar array apparatus is configured to apply voltages as input values of the row input lines, and the crossbar array apparatus is configured to output currents as output values of the column output lines.

13. A compressed-truncated singular value decomposition (C-TSVD) based crossbar array apparatus comprising:
   two partial crossbar arrays obtained by decomposing an original crossbar array in an m×n matrix connected by n (n is a natural number) row input lines and m (m is a natural number) column output lines, the matrix including cells of a resistance memory device based on C-TSVD;
   an analog to digital converter (ADC) configured to convert output values of column output lines of sub-arrays obtained by partitioning the two partial crossbar arrays through array partitioning; and
   an adder configured to sum up results of the ADC to correspond to the column output lines,
   wherein the C-TSVD based crossbar array apparatus corresponds to one layer of a neural network in neuromorphic computing, and
   wherein the crossbar array apparatus is configured to input values to the row input lines, multiply a weight by the input values, and output accumulated results as output values of the column output lines, and the weight corresponds the two partial crossbar arrays.

14. The C-TSVD based crossbar array apparatus of claim 13, wherein a matrix W of the original crossbar array is decomposed into multiplication of three matrices U, S, and $V^T$ based on SVD so that the matrix U has a size of m×m, the matrix S has a size of m×n, and the matrix $V^T$ has a size of n×n,
   wherein, when a rank of the matrix W is k (k≤ n & k≤ m), the sizes of the matrices U, S, and $V^T$ are respectively reduced to m×k, k× k, and k×n and the number of components of the matrices U, S, and $V^T$ are further reduced to k' (k'≤ k) via selection of at least partial components among the k components in large order based on TSVD,
   wherein the two partial crossbar arrays comprise a first partial crossbar array and a second partial crossbar array, the first partial crossbar array is represented as the matrix U and has a size of m×k, and the second partial crossbar array is represented as a matrix $S*V^T$ and has a size of k×n,
   wherein, when a first case in which the original crossbar array is partitioned into the sub-arrays is compared with a second case in which the two partial crossbar arrays are partitioned into the sub-arrays,
   a number of sub-arrays, a number of operations of the ADC, a number of operations of the adder, and an operating current in the second case are less than those in the first case and a number of adder stages in the first case is the same as that in the second case, and
   wherein, for at least one of the number of sub-arrays, the number of operations of the ADC, the number of operations of the adder, and the operating current, as a size of a matrix of the original crossbar array increases, a reduction in the second case relative to the first case increases.

15. The C-TSVD based crossbar array apparatus of claim 14, wherein, when k'/(m or n)*100 is a taken ratio,
   the inference accuracy is maintained to be no less than 90% and the taken ratio is taken to be no more than 10%.

16. The C-TSVD based crossbar array apparatus of claim 14, wherein, when a time spent on performing an operation of the crossbar array apparatus based on the original crossbar array is a 1-stage latency and a time spent on performing an operation of the crossbar array apparatus based on the two partial crossbar arrays is a 2-stage latency,
   as a size of a matrix of the original crossbar array increases, an increase in the 2-stage latency relative to the 1-stage latency decreases, and
   a degree of the increase is less than a degree of the reduction.

17. The C-TSVD based crossbar array apparatus of claim 14, further comprising:
   a first circuit of an identity function configured to input an output of an adder tree of the first partial crossbar array to the second partial crossbar array; and
   a second circuit of an activation function configured to activate an output of an adder tree of the original crossbar array or an output of an adder tree of the second partial crossbar array and configured to input the activated output to a next layer,
   wherein the adder tree including the adder is arranged in an output portion of the original crossbar array or an output portion of each of the first partial crossbar array and the second partial crossbar array.

* * * * *